Figure 1:
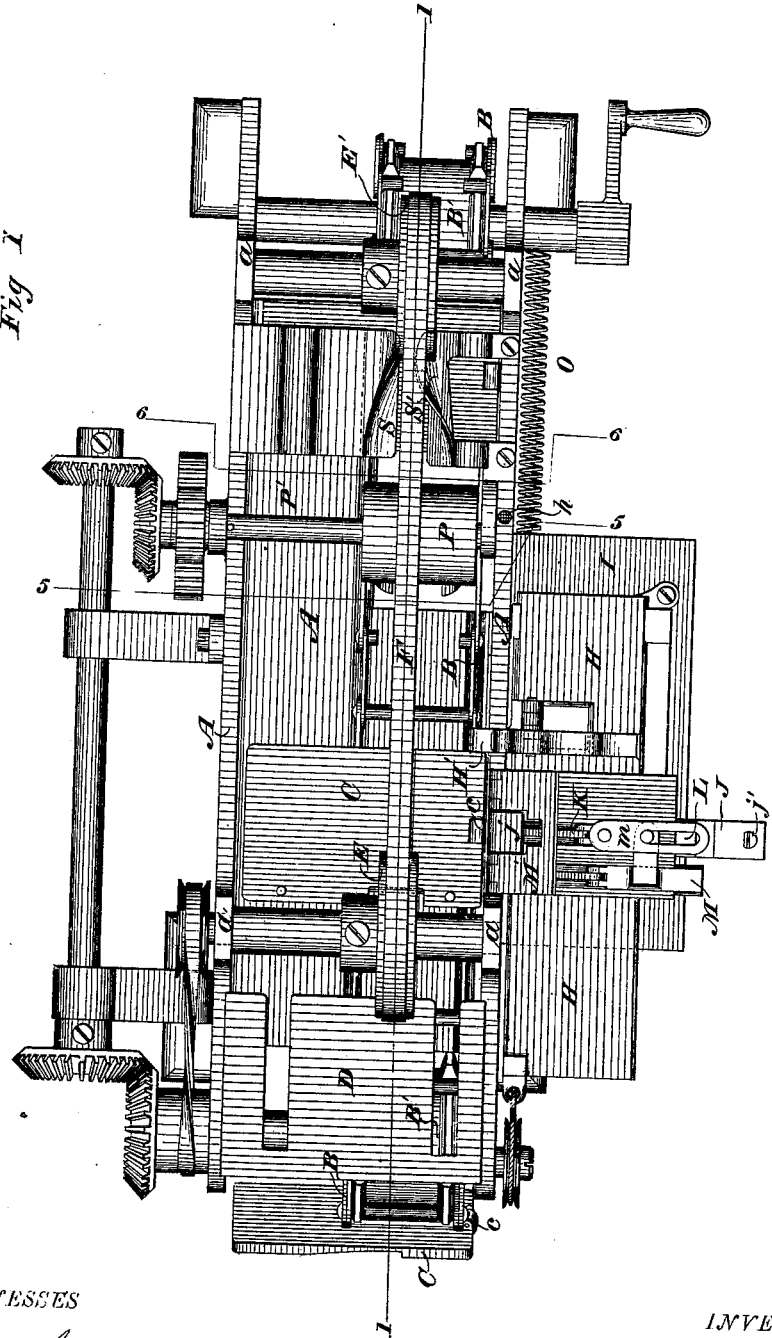

T. W. GRINTER.
PAPER-BAG MACHINES.

No. 195,501. Patented Sept. 25, 1877.

WITNESSES

INVENTOR
Thomas W. Grinter
By his Attorneys.

T. W. GRINTER.
PAPER-BAG MACHINES.
No. 195,501. Patented Sept. 25, 1877.

WITNESSES

INVENTOR
Thomas W Grinter
By his Attorneys
Baldwin, Hopkins & Peyton

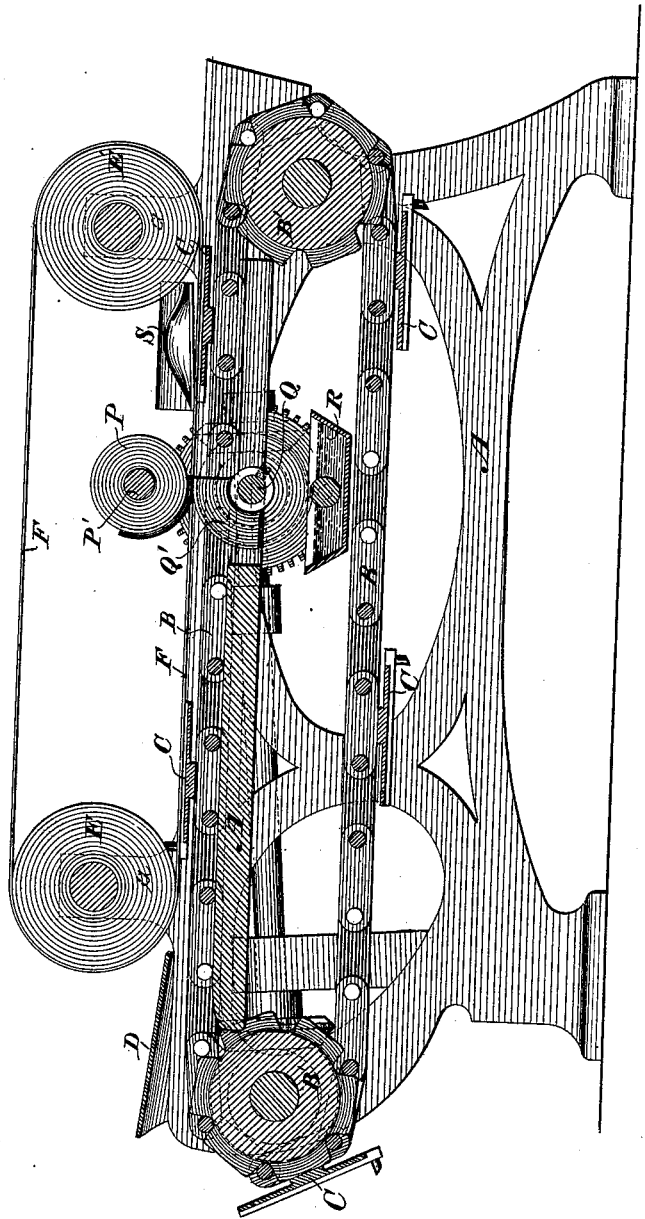

T. W. GRINTER.
PAPER-BAG MACHINES.
No. 195,501.
7 Sheets—Sheet 4.
Patented Sept. 25, 1877.
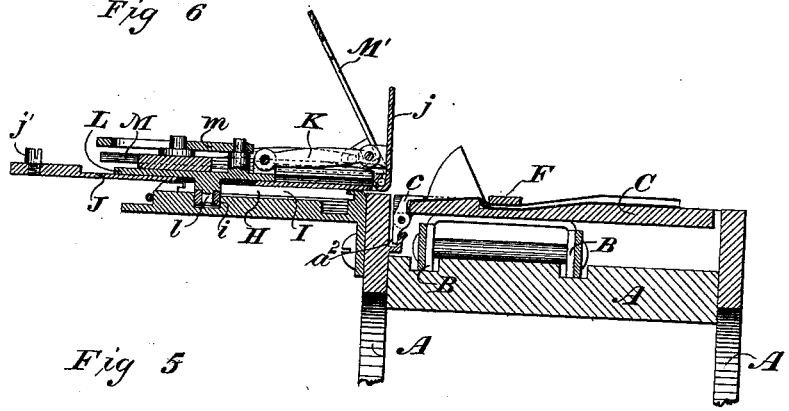
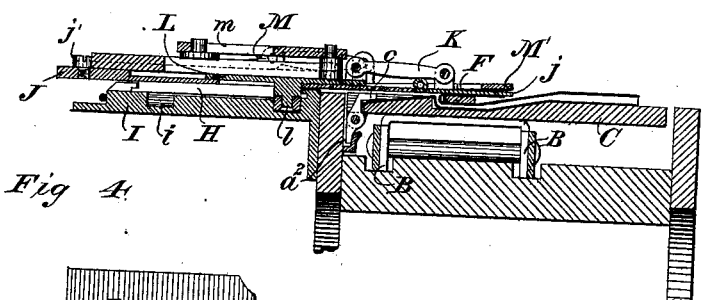
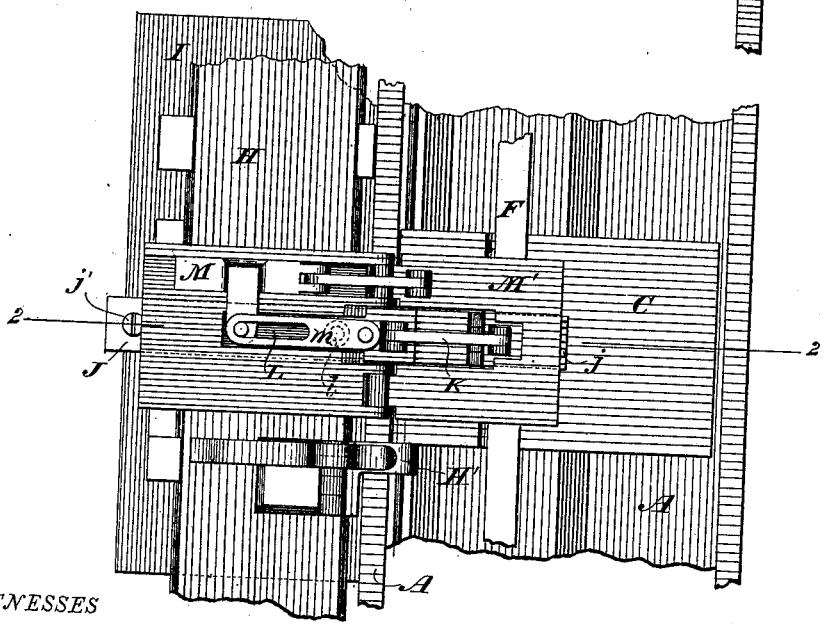
WITNESSES
Wm A. Skinkle
F. Stich
INVENTOR
Thomas W. Grinter.
By his Attorneys
Baldwin, Hopkins & Peyton

T. W. GRINTER.
PAPER-BAG MACHINES.

No. 195,501.

7 Sheets—Sheet 5.

Patented Sept. 25, 1877.

WITNESSES

INVENTOR
Thomas W. Grinter.
By his Attorneys.

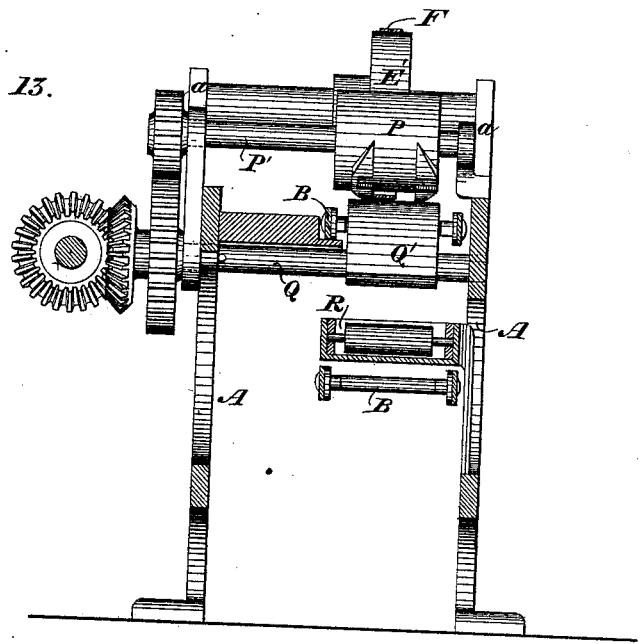

T. W. GRINTER.
PAPER-BAG MACHINES.
No. 195,501.   Patented Sept. 25, 1877.
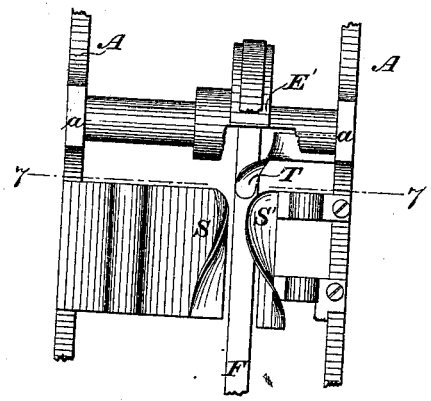
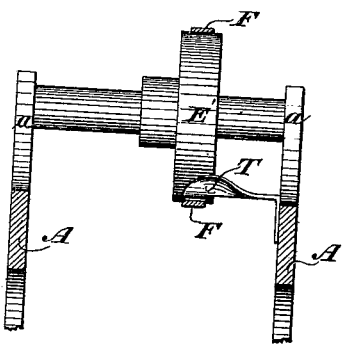
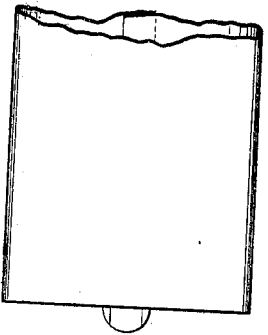
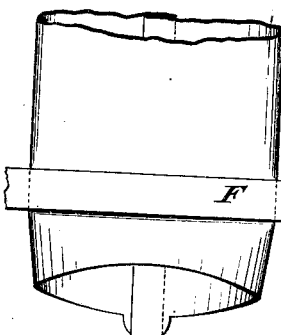
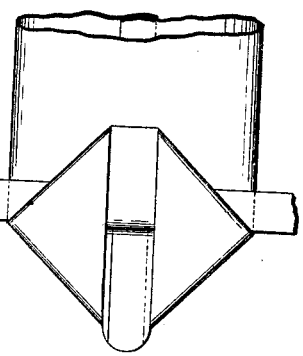
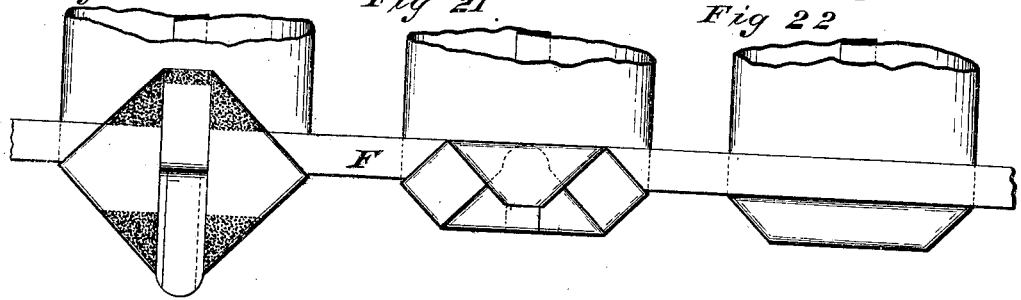
WITNESSES
INVENTOR
Thomas W. Grinter.
By his Attorneys.

UNITED STATES PATENT OFFICE.

THOMAS W. GRINTER, OF CINCINNATI, OHIO, ASSIGNOR OF ONE-HALF HIS RIGHT TO JOSEPH F. JEWETT, OF SAME PLACE.

IMPROVEMENT IN PAPER-BAG MACHINES.

Specification forming part of Letters Patent No. 195,501, dated September 25, 1877; application filed February 22, 1877.

*To all whom it may concern:*

Be it known that I, THOMAS W. GRINTER, of Cincinnati, in the county of Hamilton and State of Ohio, have invented certain new and useful Improvements in Machinery for Making Paper Bags, of which the following is a specification:

My invention relates to a machine for making satchel-bottom paper bags from previously-formed tubular blanks, which machine is especially organized for the manufacture of such bags from blanks prepared in accordance with Letters Patent No. 184,073, granted to me November 7, 1876, which blanks consist of sections or tubes of the desired size, with a lip projecting from one end thereof.

The object of the first part of my invention is to provide means for carrying the blanks to the bottom folding mechanism, which end I attain by a series of tables carried by an endless conveyer, upon which tables the folds are made.

The object of the next part of my invention is so to organize the machine that each table in succession automatically throws into operation the folding mechanism in order to form the first bottom folds of the bag.

The object of the next part of my invention is to provide each carrying-table with a central depression or recess therein, and a clip or finger on one edge thereof, whereby, in connection with an endless belt or presser-band working in said recess, and bearing upon the upper surface of the blank carried by the table, the mouth of the blank, the bottom edge of which is held down by the clip, has a tendency to partly open and provide ready entrance for the folding device, as will be clearly indicated hereinafter.

The object of the next part of my invention is to provide mechanism automatically and successively thrown into operation by a series of continuously-moving tables, said mechanism traveling with and folding back the end of each blank upon its table, and being then released to resume its normal position, to be again thrown into operation for acting upon the next blank, as will be clearly indicated hereinafter.

My invention further consists in the details of construction and organization of the machine.

The subject-matter claimed will hereinafter specifically be designated.

The accompanying drawings show all my improvements as embodied in one machine in the best way now known to me. Obviously, however, some of them may be used without the others, and in machines differing in construction from the one therein shown.

Figure 2:
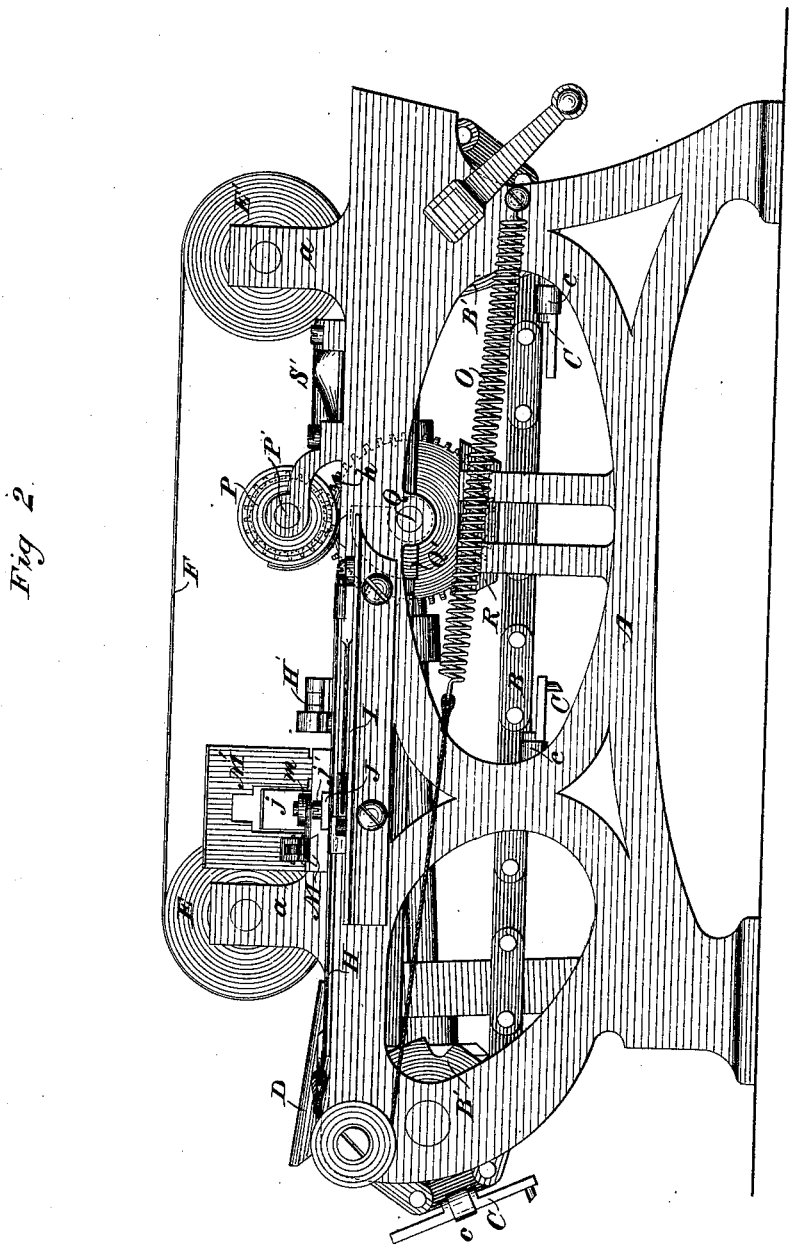
Figure 7:
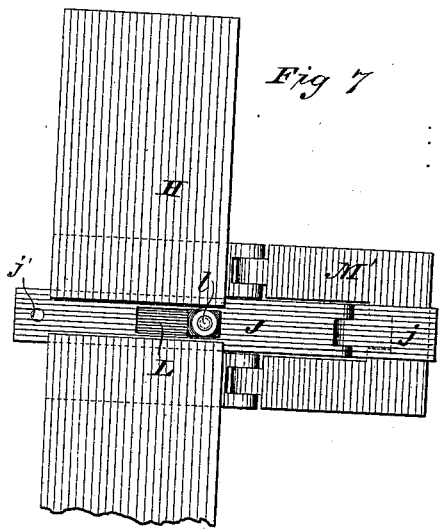
Figure 8:
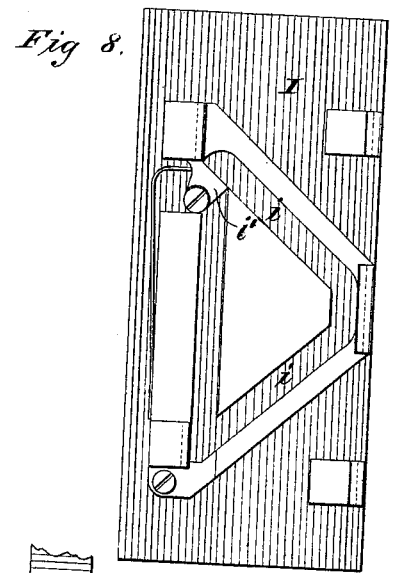
Figure 9:
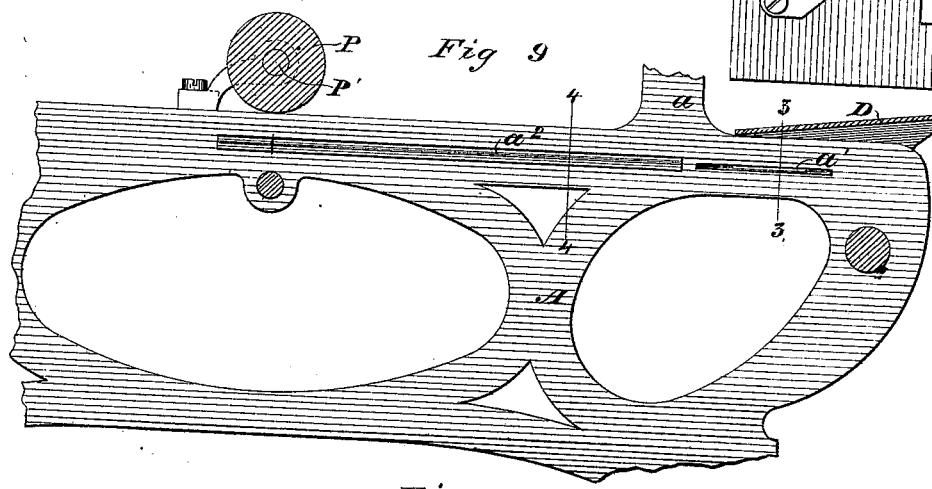
Figures 10, 11, 12:
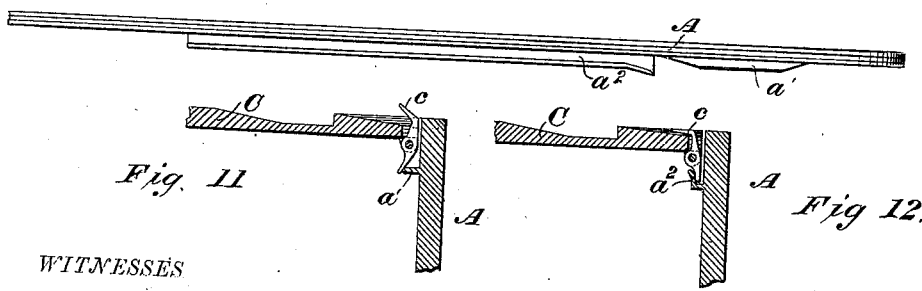

Figure 1 represents a plan or top view of so much of a machine embodying my improvements as is necessary to illustrate the subject-matter claimed. Fig. 2 represents a side elevation thereof; Fig. 3, a longitudinal central section therethrough on the line 1 1 of Fig. 1; Fig. 4, a top or plan view of the bottom opening and folding mechanism, it being shown as thrown forward upon one of the traveling-tables in the position it assumes just as it finishes folding back the end of a blank; Fig. 5, a vertical section therethrough on the line 2 2 of Fig. 4; Fig. 6, a similar section therethrough, showing the parts in the attitude they assume before the table engages with and throws the folder into operation, this figure also showing the depression or recess in the table, the clip or finger thereof, and the way in which the presser-band tends to partially open the end of the blank ready for the entrance of the folder. Fig. 7 is a bottom plan view of the folding-plates and actuating slide, and the plate upon which they are mounted detached; Fig. 8, a view of the cam-plate, in the groove of which the pin of the actuating slide shown in Fig. 7 works. Fig. 9 is a view of an inside portion of the frame, showing the cams for tripping and closing the clip or finger of the tables; Fig. 10, a top view thereof, and Figs. 11 and 12 sectional views therethrough on the lines 3 and 4, respectively, of Fig. 9. Fig. 13 represents a cross-section through the machine, on the line 5 5 of Fig. 1, showing the pasting device. Fig. 14 represents a similar section on the line 6 6 of said figure, showing the second set of folders, among other things. Fig. 15 represents a top or plan view of said folders, and Fig. 16 a sectional view on the line 7 7 of Fig. 15, showing the final folder; and Figs. 17 to 22, inclusive, show the various stages of manufacture, from the tubular blank to the finished bag as it drops from the machine.

The mechanism is mounted in a suitable frame, A, preferably of metal, the upper surface of the bed or table of which is grooved for the reception of and acts as a guide for an endless double chain, B, working over sprocket-wheels B', mounted on rollers turning in bearings in either end of the frame, said chain, in its continuous traverse, running both above and below the table of the machine. Upon this chain, at suitable distances apart, are mounted a series of tables, C, grooved or recessed on their upper surfaces, lengthwise of their traverse, and in one edge thereof is mounted a clip or finger, c, capable of being tripped or raised from the edge of the table, or of being held close thereto. At the head of the machine there is mounted a slotted feed-board, D, upon which the tubes or blanks to be run through the machine are placed, either by automatic mechanism or by hand, the latter method being the one employed in the present instance.

I have devised and perfected an improved automatic feed for this class of machines, the invention of which will constitute the subject-matter for other Letters Patent, and will not, therefore, be shown or described herein.

From the side pieces of the frame, at either end of the machine, rise standards $a\ a$, which form bearings for rollers carrying pulleys E E', around which passes an endless belt or presser-band, F, traveling in the same direction as the endless chain, and at the same speed, the lower half of which band runs in the grooves in the tables carried by said chain. The pulley at the head of the machine is located just in front of the feed-board D.

The tubes or blanks, such as shown in Fig. 17, (a method of and apparatus for the manufacture of which, as hereinbefore stated, being embodied in Letters Patent No. 184,073, granted to me November 7, 1876,) are placed upon the tables as they emerge from beneath the feed-board, just at which point the clip or finger c is thrown up by its depending end being acted upon by a lug, $a^1$, on the inside of the frame, to permit the lip projecting from the bottom edge of the blank to be placed thereunder, (the length of the blank running crosswise of the machine,) and, as the table continues to advance under the endless belt or presser-band F, said band presses upon the upper surface of the blank and forces its central portion down into the recess of the table, just at which time the clip or finger is forced down upon the projecting lip of the blank by its depending end riding in a groove, $a^2$, on the inner side of the frame, which, together with the opening lug $a^1$, are shown in Figs. 9 to 12, inclusive.

The effect of this method of manipulating the blank, which is being carried by the continuously-moving table toward the bottom folding mechanism, is that its lower edge is held down while its center is depressed, which causes the upper end of the tube to open a sufficient distance to permit of the ready entrance of the folder, as clearly shown in Figs. 6 and 18.

The mechanism for opening or folding out the end of the blank in proper shape for applying the paste, preparatory to its being passed to the final folders, is mounted upon a plate, H, reciprocating in guideways on a plate, I, securely fastened to one of the side pieces of the frame, which latter plate is provided with a cam-groove, $i$, on its upper surface, as clearly shown in Figs. 5, 6, and 8.

This folding mechanism consists of a slotted slide, J, having a back and forward movement crosswise of the longitudinally-reciprocating plate H, and in a groove therein, the inner end of which slide terminates in a hinged flap, $j$, which flap is connected by a pitman, K, with another slide, L, working in the same groove, and immediately on top of the slide J. A pin or stud, $l$, projecting downward from the slide L, passes through the slot in the slide J and engages in the cam-groove $i$, and the outer end of the latter slide has a stop-pin, $j'$, to limit its movement. A third slide, M, works in a groove in the plate H, parallel with the others, and is connected by a pitman with a presser-plate, M', hinged to the edge of the plate H, and, by means of a slotted link-connection, $m$, with the slide L, controls and times the movement of said presser-plate.

As the continuously-moving tables carrying the partly-opened blanks advance they strike one after another against a hinged arm, H', projecting from the plate H into the path of traverse of the tables, and carry forward the plate with the folding mechanism mounted upon it. This forward movement causes the pin $l$, carried by the slide L, to ride in the cam-groove, which throws forward the flap or hinged end of the opening slide J into the mouth of the tube, by means of the pitman-connection between the two slides, until the stop-pin $j'$, on the rear end of the slide J, abuts against the edge of the plate H, when the pin L, continuing its traverse in the cam-groove, continues to carry forward the slide L, the pin working through a slot in the opening slide, and forces down the flap, thus folding out the end of the tube, as shown at Fig. 19, and at the same time the presser-plate M' is thrown down by its slide being thrown forward through its slotted link-connection $m$ with the slide L, thus completely pressing out the end of the tube.

At the moment the presser-plate is thrown forward the pin $l$ reaches the end of its upward traverse, and allows the mechanism time to thoroughly fold or press out the end of the tube, but as the pin continues to advance and begins to ride in the down-groove of the cam-plate, the slides are retracted to their normal position, at which time the pin has reached the straight portion of the cam-groove, in readiness to be returned to its starting-point, when the hinged arm H' shall be released from the continuously-moving tables, which takes place immediately after the retraction.

of the folding mechanism by the hinged arm riding over a cam, *h*, on the frame. A spring bears upon the hinged arm so as always to keep it in position to be acted upon by each succeeding table.

The reciprocating plate is returned to its normal position or starting-point, after being released from each successive table, by the tension of a spring, O, one end of which is secured to the frame and the other is connected to the plate by a cord passing over a pulley at the head of the machine; but a weight or any other suitable device can be used for this purpose.

A spring-latch, *i'*, at the end of the cam-groove, insures the pin taking the right direction of traverse therein.

The blank, after being folded back, is carried by the table to the pasting device, which consists of a wheel, P, provided with raised pads of the proper size and shape required for the bottom of the bag, mounted upon a shaft, P', journaled in bearings above the line of traverse of the tables. Beneath this roller, and geared therewith, is another shaft, Q, turning in bearings in the frame beneath the table of the machine, upon which is mounted a segment, Q', which conveys paste from a fountain or trough, R, supported beneath the frame, to the pasting-wheel, at proper intervals before the passage of each table thereunder, the rollers being so geared that the pasting-roller makes two revolutions to one of the segment, so that, while the pasting-wheel is applying its paste to the blank, the segment is receiving a fresh supply from the fountain.

The table of the machine is slotted, and the links of the chain, at proper intervals between the traversing-tables, are cut away to permit of the free access of the segment to the pasting-wheel.

From the pasting device the blank is carried to the curved folding-plates S S', the trip or finger having been released, just after the pasting operation, to leave the folded end of the blank entirely free, which folders are of well-known construction, and fold the blank, as shown in Fig. 21, and from thence it passes to the final folder T, the operation of which is well understood, which completes the bag, as shown in Fig. 22, and allows it to be dropped or carried from the machine.

The final folds may be made by hand instead of automatically, if desired.

The machine is driven from any suitable prime mover and by proper gearing, power being applied in this instance to the shaft of the sprocket-wheel at the foot of the machine, which drives the shaft carrying the sprocket-wheel at the head thereof, on the end of which is a bevel-pinion meshing with a similar wheel on the end of a counter-shaft turning in bearings parallel with and projecting from the side of the frame, a bevel-wheel on the opposite end of said shaft meshing with a similar wheel on the end of the shaft upon which the pasting-segment is mounted, and a spur-gear thereon meshing with and driving one of smaller diameter on the pasting-wheel shaft, which, with a belt-connection between the sprocket-wheel shaft at the head of the machine and the presser-band pulley-shaft at that end, complete the gearing necessary for the machine organized as shown.

The advantages of my improvements will be obvious to skillful constructors of this class of machines without further description.

I claim as of my own invention—

1. A series of flexibly-connected traversing-tables, operating substantially as hereinbefore set forth, upon each of which tables a blank is folded while the table is in motion.

2. The combination, substantially as hereinbefore set forth, of a series of traversing-tables with folding mechanism, automatically operated by the movement of said tables.

3. A blank carrying and folding table, constructed, substantially as hereinbefore set forth, with a depression or recess therein parallel with its line of movement, and a clip or finger mounted thereon, for the purposes specified.

4. The combination, substantially as hereinbefore set forth, of a series of traversing blank-carrying tables, folding mechanism, substantially as described, automatically and successively thrown into operation by, and traveling temporarily with, said tables while acting upon the blanks and mechanism, substantially as described, which automatically releases and returns the folding mechanism to its normal position when the folding is completed.

5. The combination, substantially as hereinbefore set forth, of a paste-fountain below the path of the blank, a paste-wheel above said path, and an intermediate conveyer or segment which conveys paste across the path of said blank from the fountain to the roller.

6. The combination, substantially as hereinbefore set forth, of a series of traversing blank-carrying tables, a presser-band running in grooves or recesses in said tables, folding mechanism automatically thrown into operation by said tables, mechanism for retracting the folding mechanism when released by the tables, pasting mechanism, and mechanism for forming the final folds after pasting, the said folding, retracting, pasting, and forming mechanism being and operating substantially as set forth.

7. The mechanism for folding out the end of the blank, primarily consisting of the combination, substantially as hereinbefore set forth, of the cam-plate, the carrier-plate reciprocating thereon, and the slides carrying the opening and presser-plates, which slides are all actuated by a pin working in a groove of the cam-plate, as hereinbefore described.

In testimony whereof I have hereunto subscribed my name.
THOMAS W. GRINTER.

Witnesses:
S. B. SPEAR,
CLARENCE J. McLYMON.